(12) United States Patent
Kim et al.

(10) Patent No.: US 7,680,740 B2
(45) Date of Patent: *Mar. 16, 2010

(54) MANAGING COPY PROTECTING INFORMATION OF ENCRYPTED DATA

(75) Inventors: Hyung Sun Kim, Seoul (KR); Byuong Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/980,492

(22) Filed: Oct. 31, 2007

(65) Prior Publication Data

US 2008/0240442 A1 Oct. 2, 2008

Related U.S. Application Data

(63) Continuation of application No. 11/511,409, filed on Aug. 29, 2006, which is a continuation of application No. 10/258,416, filed as application No. PCT/KR02/00424 on Mar. 12, 2002, now Pat. No. 7,225,162.

(30) Foreign Application Priority Data

Mar. 13, 2001 (KR) .................................. 10-12998

(51) Int. Cl.
*G06F 17/60* (2006.01)
(52) U.S. Cl. .......................................... 705/50; 705/51
(58) Field of Classification Search ................... 705/50, 705/51

See application file for complete search history.

(56) References Cited

U.S. PATENT DOCUMENTS

| | | | |
|---|---|---|---|
| 5,138,925 A | 8/1992 | Koguchi et al. | |
| 5,319,705 A | 6/1994 | Halter et al. | |
| 5,594,794 A | 1/1997 | Eyer et al. | |
| 5,646,992 A | 7/1997 | Subler et al. | |
| 5,715,403 A | 2/1998 | Stefik | |
| 5,729,549 A | 3/1998 | Kostreski et al. | |
| 5,798,991 A | 8/1998 | Haneda | |
| 5,805,551 A | 9/1998 | Oshima et al. | |
| 5,812,661 A | 9/1998 | Akiyama et al. | |
| 5,825,876 A * | 10/1998 | Peterson, Jr. ................. | 705/52 |
| 5,933,498 A | 8/1999 | Schneck et al. | |

(Continued)

FOREIGN PATENT DOCUMENTS

CN   1166223 A   11/1997

(Continued)

OTHER PUBLICATIONS

Digital Video Disk, Digital Versatile Disk, Optical Storage Technology Association, Feb. 25, 2000, pp. 99-109.

(Continued)

*Primary Examiner*—Pierre E Elisca
(74) *Attorney, Agent, or Firm*—Birch, Stewart, Kolasch & Birch, LLP (57) ABSTRACT

The present invention provides according to an embodiment a method of reproducing digital content, comprising the steps of: (a) reading a position information where a sample data is present, the sample data being same as a portion of digital content and not encrypted; and (b) reproducing the sample data based on the read position information without a key information, the key information required for decrypting an encrypted digital content.

10 Claims, 5 Drawing Sheets

U.S. PATENT DOCUMENTS

| | | | |
|---|---|---|---|
| 5,991,399 | A | 11/1999 | Graunke et al. |
| 6,011,761 | A | 1/2000 | Inoue |
| 6,041,345 | A | 3/2000 | Levi et al. |
| 6,044,047 | A | 3/2000 | Kulas |
| 6,075,862 | A | 6/2000 | Yoshida et al. |
| 6,125,229 | A | 9/2000 | Dimitrova et al. |
| 6,140,565 | A | 10/2000 | Yamauchi et al. |
| 6,252,964 | B1 | 6/2001 | Wasilewski et al. |
| 6,278,836 | B1 | 8/2001 | Kawara et al. |
| 6,330,490 | B1 | 12/2001 | Kim et al. |
| 6,351,442 | B1 | 2/2002 | Tagawa et al. |
| 6,385,389 | B1 | 5/2002 | Maruyama et al. |
| 6,453,459 | B1 | 9/2002 | Brodersen et al. |
| 6,567,371 | B1 | 5/2003 | Otomo et al. |
| 6,567,567 | B1 | 5/2003 | Levin et al. |
| 6,675,179 | B2 | 1/2004 | Morohashi |
| 6,868,403 | B1 | 3/2005 | Wiser et al. |
| 6,889,327 | B1 | 5/2005 | Inoha |
| 6,901,385 | B2 | 5/2005 | Okamoto et al. |
| 6,920,567 | B1 | 7/2005 | Doherty et al. |
| 6,931,451 | B1 | 8/2005 | Logan et al. |
| 6,938,162 | B1 | 8/2005 | Nagai et al. |
| 6,988,144 | B1 | 1/2006 | Luken et al. |
| 7,058,977 | B1 | 6/2006 | Furukawa et al. |
| 7,072,260 | B1 | 7/2006 | Sako et al. |
| 7,073,063 | B2 | 7/2006 | Peinado |
| 7,076,468 | B2 | 7/2006 | Hillegass et al. |
| 7,092,911 | B2 * | 8/2006 | Yokota et al. ............. 705/57 |
| 7,113,983 | B1 | 9/2006 | Terada et al. |
| 7,117,179 | B2 | 10/2006 | Kim et al. |
| 7,124,303 | B2 | 10/2006 | Candelore et al. |
| 7,191,153 | B1 | 3/2007 | Braitberg et al. |
| 7,225,162 | B2 | 5/2007 | Kim et al. |
| 7,380,135 | B2 | 5/2008 | Nishimoto et al. |
| 7,499,993 | B2 | 3/2009 | Seo |
| 7,519,274 | B2 | 4/2009 | Li |
| 7,542,656 | B2 | 6/2009 | Cho et al. |
| 7,587,368 | B2 | 9/2009 | Felsher |
| 2001/0013022 | A1 | 8/2001 | Proidl |
| 2001/0026618 | A1 * | 10/2001 | Van Wie et al. ............. 380/232 |
| 2002/0010679 | A1 | 1/2002 | Felsher |
| 2002/0023010 | A1 | 2/2002 | Rittmaster et al. |
| 2002/0032747 | A1 | 3/2002 | Toki |
| 2002/0077988 | A1 | 6/2002 | Sasaki et al. |
| 2002/0107809 | A1 | 8/2002 | Biddle et al. |
| 2002/0112226 | A1 | 8/2002 | Brodersen et al. |
| 2002/0157521 | A1 | 10/2002 | Shahal |
| 2002/0172366 | A1 | 11/2002 | Peterka et al. |
| 2003/0048293 | A1 | 3/2003 | Werkhoven |
| 2003/0051151 | A1 | 3/2003 | Asano et al. |
| 2003/0105717 | A1 | 6/2003 | Kim et al. |
| 2004/0024688 | A1 | 2/2004 | Bi et al. |
| 2004/0088183 | A1 | 5/2004 | Nakanishi et al. |
| 2004/0255330 | A1 | 12/2004 | Logan |
| 2005/0036763 | A1 | 2/2005 | Kato et al. |
| 2005/0084251 | A1 | 4/2005 | Kitahashi et al. |
| 2005/0096983 | A1 | 5/2005 | Werkhoven |
| 2005/0238057 | A1 | 10/2005 | Toma et al. |
| 2006/0059128 | A1 | 3/2006 | Ruggle et al. |
| 2006/0095381 | A1 * | 5/2006 | Yokota et al. ............. 705/57 |
| 2007/0174568 | A1 | 7/2007 | Kii |
| 2007/0180534 | A1 * | 8/2007 | Ishizaka et al. ............. 726/26 |
| 2009/0086966 | A1 | 4/2009 | Haruki et al. |
| 2009/0172598 | A1 | 7/2009 | Yamanaka et al. |
| 2009/0287837 | A1 | 11/2009 | Felsher |

FOREIGN PATENT DOCUMENTS

| | | |
|---|---|---|
| CN | 1219728 A | 6/1999 |
| CN | 1273669 A | 11/2000 |
| DE | 199 06 449 C1 | 8/2000 |
| EP | 0 798 892 A2 | 10/1997 |
| EP | 0 802 527 A1 | 10/1997 |
| EP | 0 899 733 A1 | 3/1999 |
| EP | 0 911 738 A2 | 4/1999 |
| EP | 0 788 106 B1 | 10/1999 |
| EP | 1 079 628 A2 | 2/2001 |
| EP | 1 122 729 A1 | 8/2001 |
| EP | 1 041 566 B1 | 5/2003 |
| EP | 1 126 463 B1 | 11/2004 |
| JP | 63-213188 | 9/1988 |
| JP | 5-225759 A | 9/1993 |
| JP | 08-018552 | 1/1996 |
| JP | 09-044353 | 2/1997 |
| JP | 9-44353 A | 2/1997 |
| JP | 9-73480 A | 3/1997 |
| JP | 9-73487 A | 3/1997 |
| JP | 9-91344 A | 4/1997 |
| JP | 10-135944 A | 5/1998 |
| JP | 10-208388 | 8/1998 |
| JP | 10-208444 | 8/1998 |
| JP | 10-255448 | 9/1998 |
| JP | 10-257416 A | 9/1998 |
| JP | 10-289206 A | 10/1998 |
| JP | 10-326463 | 12/1998 |
| JP | 11-066813 | 3/1999 |
| JP | 11-143719 A | 5/1999 |
| JP | 11-238365 | 8/1999 |
| JP | 11-296984 A | 10/1999 |
| JP | 11-312175 A | 11/1999 |
| JP | 11-328851 A | 11/1999 |
| JP | 11-353800 | 12/1999 |
| JP | 2000-076338 | 3/2000 |
| JP | 2000-083022 | 3/2000 |
| JP | 2000-163488 | 6/2000 |
| JP | 2000-163877 A | 6/2000 |
| JP | 2000-195175 | 7/2000 |
| JP | 2000-196585 | 7/2000 |
| JP | 2000-253364 | 9/2000 |
| JP | 2000-268096 | 9/2000 |
| JP | 2000-0268497 | 9/2000 |
| JP | 2000-268497 A | 9/2000 |
| JP | 2000-276840 | 10/2000 |
| JP | 2000-298689 | 10/2000 |
| JP | 2000-322875 | 11/2000 |
| JP | 2000-330873 A | 11/2000 |
| JP | 2000-332706 | 11/2000 |
| JP | 2000-348003 | 12/2000 |
| JP | 2000-350181 A | 12/2000 |
| JP | 2001-006334 | 1/2001 |
| JP | 2001-6334 A | 1/2001 |
| JP | 2001-042866 | 2/2001 |
| JP | 2001-052467 | 2/2001 |
| JP | 2001-103047 | 4/2001 |
| JP | 2001-216418 | 8/2001 |
| JP | 2003-502722 | 1/2003 |
| JP | 2004-519808 | 7/2004 |
| JP | 2005-204175 A | 7/2005 |
| JP | 2007-213327 A | 8/2007 |
| JP | 2009182946 A * | 8/2009 |
| KR | 10-2001-0097945 A | 11/2001 |
| WO | WO 00/05715 A1 | 2/2000 |
| WO | WO-00/51036 A2 | 8/2000 |
| WO | WO-00/67130 A1 | 11/2000 |
| WO | WO-01/15164 A1 | 3/2001 |
| WO | WO 02/073616 A1 | 9/2002 |

OTHER PUBLICATIONS

"High density DVD logical format," Digital Video Disk, Digital Versatile Disk, Optical Storage Technology Association, Feb. 25, 2000, pp. 99-109.

* cited by examiner

MANAGING COPY PROTECTING INFORMATION OF ENCRYPTED DATA

This application is a Continuation of U.S. patent application Ser. No. 11/511,409 filed on Aug. 29, 2006, which is a continuation of application Ser. No. 10/258,416 filed on Oct. 23, 2002, now U.S. Pat. No. 7,225,162 and for which priority is claimed under 35 U.S.C. §120, and also claims priority benefit of Korean Application No. 2001/12998, filed on Mar. 13, 2001 in Korea. U.S. patent application Ser. No. 10/258, 416 is the national phase of PCT International Application No. PCT/KR02/00424 filed on Mar. 12, 2002 under 35 U.S.C. §371. The entire contents of each of the above-identified applications are hereby incorporated by reference.

BACKGROUND OF THE INVENTION

1. Field of the Invention

The present invention relates to a read-only recording medium containing encrypted source data and sample data thereof. The present invention further relates to a method of reproducing said recording medium.

2. Discussion of the Background Art

In these days, it is expected that on-line multi-media contents selling methods will be widely used. In such on-line selling methods, moving-picture data or audio data are delivered to a buyer's recording medium such as a writable CD or DVD through a data network and are then played back from that recording medium.

The audio data to be provided via a network are called EMD (Electronic Music Distribution) audio data. EMD audio data are provided by a lot content providers. However, the content providers encode END audio data to mutually different formats and a different unique copy-protection keys, namely, encryption keys to EMD audio data as well to prevent unauthorized copy and to protect their copyright.

A decryption key adequate for downloaded EMD audio data must be obtained from a contents provider having provided the END audio data before playing the downloaded EMD audio data. The decryption key is used for decrypting EMD audio data encrypted with a corresponding copy-protection key.

Because it is nearly impossible to obtain an adequate decryption key without lawful approval, EMD audio data can be protected against unauthorized copy, thus its copyright can be protected well.

To enjoy such a data protecting advantage, high-quality moving-picture data and/or audio data will be encrypted in general to sell them to buyers through a network. In addition, because of such a data protecting advantage, on-line content selling methods are expected to be spread more and more.

However, as aforementioned, encrypted EMD audio data must require a copy-protection key, namely, a decryption key to be played back. Therefore, a user can not play with a disk device any piece of EMD audio data downloaded onto a writable recording medium before he or she purchases a decryption key. In other words, a user can not confirm at all whether the downloaded EMD audio data are what he or she wants or whether its audio quality is better or not than he or she expected. Consequently, a user hesitates to buy a play-authorizing key, namely, a decryption key for the downloaded EMD audio data.

In the meantime, when a user wants to buy his or her favorite digital song or music, he or she makes web-surfing on Internet to find a web site and then searches the web site for his or her favorite song or music. If found, he or she requests it to be downloaded to a recording medium. Theses procedures take much time and effort, which would impede spread of the on-line selling methods of digital contents.

SUMMARY OF THE INVENTION

It is an object of the present invention to provide a read-only recording medium on which encrypted moving picture data and/or audio data and non-encrypted their sample data have been recorded.

It is another object of the present invention to provide a method of reproducing only-non-encrypted sample data of a read-only recording medium without a decryption key to induce a user to make on-line purchase of the decryption key.

A read-only recording medium storing data in accordance with an aspect of the present invention includes: a first area storing data; and a second area storing management information for the data stored in said first area, wherein said first area includes encrypted source data and non-encrypted sample data that have same contents with a part of the source data, and wherein said second area includes location information of the non-encrypted sample data.

A method of reproducing a recording medium containing encrypted source data and non-encrypted sample data that have same contents with a part of the encrypted source data in accordance with another aspect of the present invention includes the steps of: checking, when play of the encrypted source data is requested, whether or not there is decrypting information for the encrypted source data in a disk device; reading location information pointing the non-encrypted sample data, if there is not the decrypting information; and reproducing the non-encrypted sample data using the read location information, instead of the encrypted source data of which play has been requested.

Another method of reproducing a recording medium containing encrypted source data and non-encrypted sample data that have same contents with a part of the encrypted source data in accordance with another aspect the present invention includes the steps of: checking, when play of the encrypted source data is requested, whether or not there is decrypting information for the encrypted source data in a disk device; receiving the decrypting information through communication with an external device and storing in the disk device, if there is not the decrypting information; and reproducing the encrypted source data with reference to location information of the encrypted source data while decrypting them with the stored decrypting information.

The present invention discussed herein enables a user to confirm whether source data written on a read-only recording medium are what he or she wants without buying a decryption key for the source data. Consequently, purchase of a decryption key for encrypted contents is naturally induced from previewing or pre-listening sample data. In addition, on-line selling procedure is very simple and fast because it is finished only by downloading a decryption key.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

The accompanying drawings, which are included to provide a further understanding of the present invention illustrate the preferred embodiments of the invention, and together with the description, serve to explain the principles of the present invention, and wherein.

DETAILED DESCRIPTION OF THE PREFERRED EMBODIMENTS

In order that the invention may be fully understood, preferred embodiments thereof will now be described with reference to the accompanying drawings.

Figure 1:
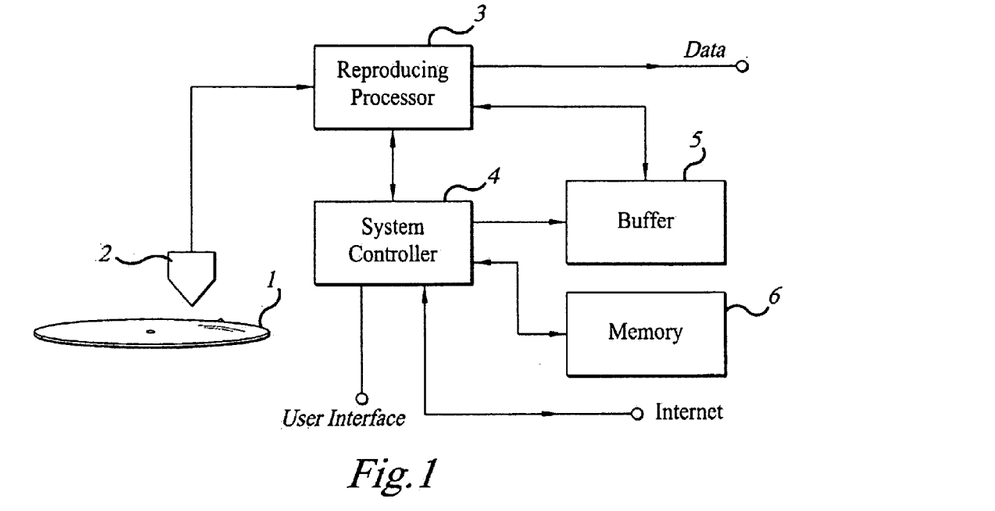
FIG. 1 is a simplified block diagram of an optical disk device in which a data reproducing method of the present invention is embedded.

FIG. 1 is a simplified block diagram of an optical disk device in which a data reproducing method of the present invention is embedded. The device may be a disk drive installed in a personal computer (PC) being able to connect to Internet.

The disk device FIG. 1 comprises an optical pickup 2 reading signals written on a read-only disk 1, e.g., a DVD-ROM; a reproducing processor 3 processing the read signals to restore to original data; a buffer 5 buffering temporary data, e.g., ecrypted data produced during reproducing operation; a memory 7 for storing navigation data, which are management information used for reproduction control of recorded data, and a decryption key for the recorded source data; and a system controller 4 controlling all the elements during playback, selectively playing encrypted source or non-encrypted sample data, and requesting/receiving a decryption key interfacing with a connected PC, all operatively coupled and configured.

The read-only disk 1 contains not only encrypted source data, namely, video and/or audio contents but also non-encrypted sample data that are same with a part of the source data.

The read-only disk 1 may be a DVD-ROM and has two zones, one zone for source and sample data and the other for management information thereof. If the source data are composed of a plurality of audio tracks, sample audio data have been written for each audio track. And, sample audio data associated with an audio track form a sample track.

A track is managed as an audio object (AOB) so that cell information (CI) that is, reproduction control information is created for each AOB in the management information zone. The CI includes location information. (namely, start and end address or start address and duration) of an associated AOB.

Therefore, if there are N source audio tracks in the data zone, the disk includes 2×N AOBs and their 2×N pieces of CI.

The management information zone of the read-only disk 1 also includes original and user-defined program chain information. (PGCI) that includes the created CI as its own field element. Therefore, the PGCI can index individually a plurality of AOBs pointed by respective CI fields it includes. Namely, if a piece of PGCI is chosen automatically or by a user, AOBs pointed by CI contained in the selected PGCI can be searched for and played back.

Figure 2:
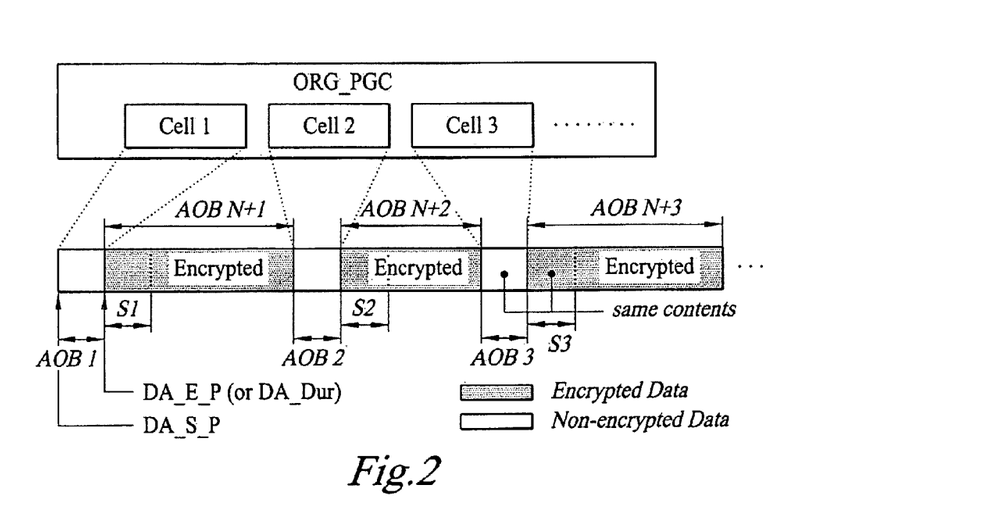
FIG. 2 shows schematic reaction between PGCI (Program Chain Information) and sample AOBs (Audio Objects) for source Audio tracks recorded on a read-only disk in accordance with the present invention.

FIG. 2 shows schematic relation between PGCI and sample AOBs for source audio tracks recorded on the read-only disk. In the example of FIG. 2, source tracks 'AOB N+1, N+2, N+3, . . . ' containing encrypted audio data have been recorded on the read-only disk 1, and sample tracks 'AOB 1, 2, 3, . . . ' also have been recorded thereon. Each sample track has non-encrypted audio data that are same with a part of each source track 'S1, S2, S3, . . . '. In addition, plural pieces of CI 'Cell 1, 2, 3, . . . ' that include respective location information (start 'DA_S_P' and end address 'DA_E_P' or start address 'DA_S_P' and, duration 'DA_Dur') of the sample tracks 'AOB 1, 2, 3, . . . ' have been written in original PGCI. Therefore, if the original PGCI is selected, only the sample tracks 'AOB 1, 2, 3, . . . ' of the source tracks 'AOB N+1, N+2, N+3' are played back.

Figure 3:
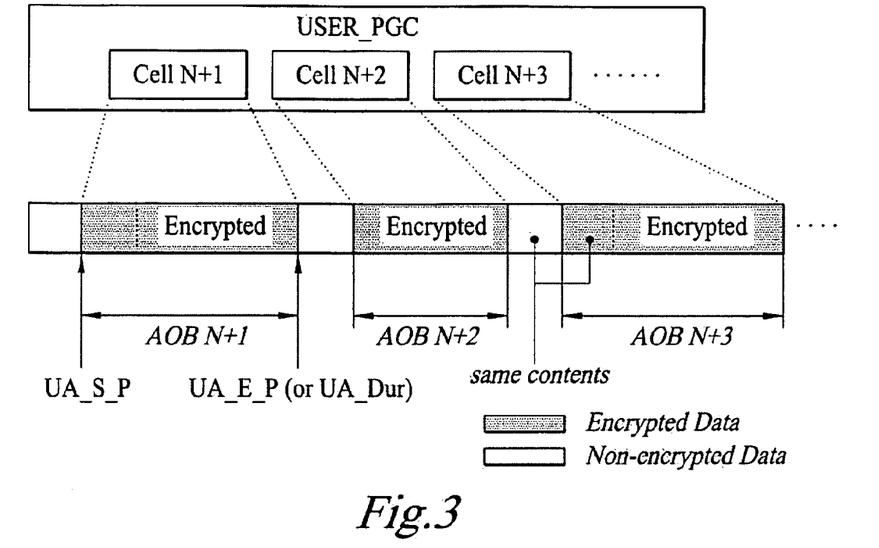
FIG. 3 shows schematic relation between PGCI and source tracks containing encrypted audio data recorded on a read-only disk in accordance with the present invention.

FIG. 3 shows schematic relation between PGCI and source tracks containing encrypted audio data recorded on the read-only disk 1. For the example of FIG. 3 plural pieces of CI 'Cell N+1, N+2, N+3' that include respective location information (start 'UA_S_P' and end address 'UA_E_P' or start address 'UA_S_P' and duration 'UA_Dur'), of the source tracks 'AOB N+1, N+2, N+3, . . . ' have been written in user-defined PGCI. Therefore, if the user-defined PGCI is selected the source tracks 'AOB N+1, N+2, N+3, . . . ' are played back sequentially if there is a decryption key for the source tracks.

Accordingly, if there is not a decryption key the system controller 4 selects the original PGCI and then plays back non-encrypted sample data pointed by CI included in the original PGCI, and if there is it selects the user-defined PGCI and then plays back source track while decrypting encrypted data with an adequate decryption key stored in the memory 6.

Figure 4:
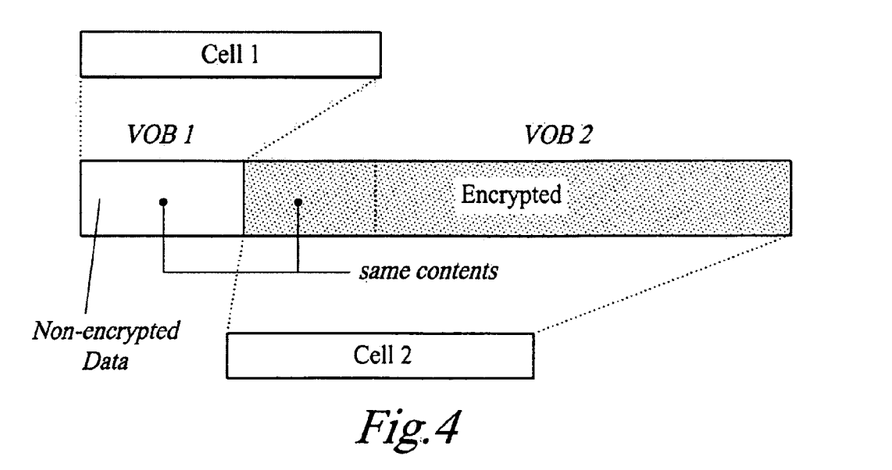
FIG. 4 shows schematic relation between CI (Cell Information) and encrypted source and non-encrypted sample video object recorded on a read only disk in accordance with the present invention.

If video contents are recorded on the data zone of the read-only disk 1 instead of audio contents, each source track is unitized to not AOB but VOB (Video Object). However, management information for VOB is created the same as for AOB. Namely, as shown in FIG. 4, a sample VOB 'VOB 1' has been created for a source VOB 'VOB 2'. The sample VOB 'VOB 1' has non-encrypted video data that are same with a part of the source VOB 'VOB 2' containing encrypted video data. In addition, two pieces of CI that refer the sample and source VOB respectively have been written different or same PGCI.

An embodiment of a method reproducing the read-only disk 1 containing data configured as above is explained in detail below.

Figure 5A:
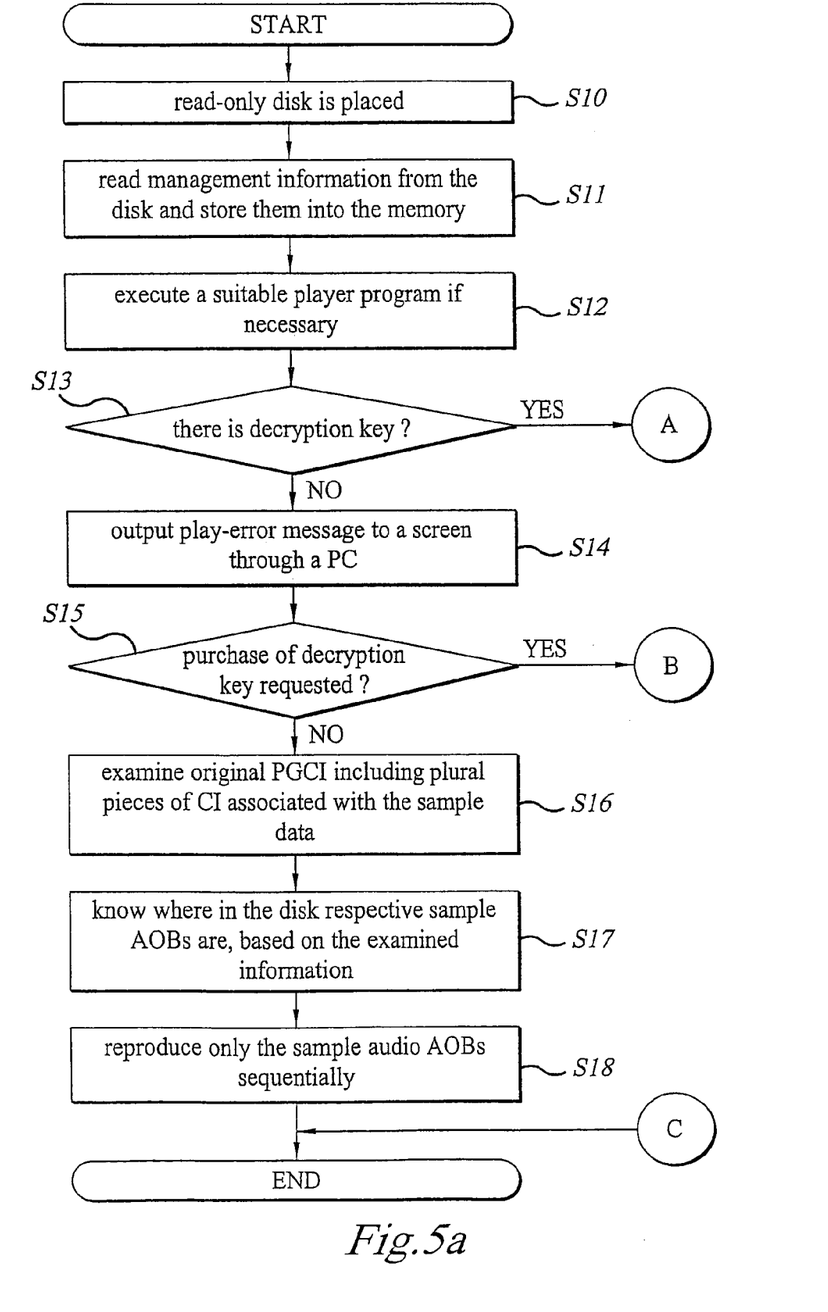
FIGS. 5*a* and 5*b* are flow charts of an embodiment of a method playing encrypted source or non-encrypted sample data selectively in accordance with the present invention.
Figure 5B:
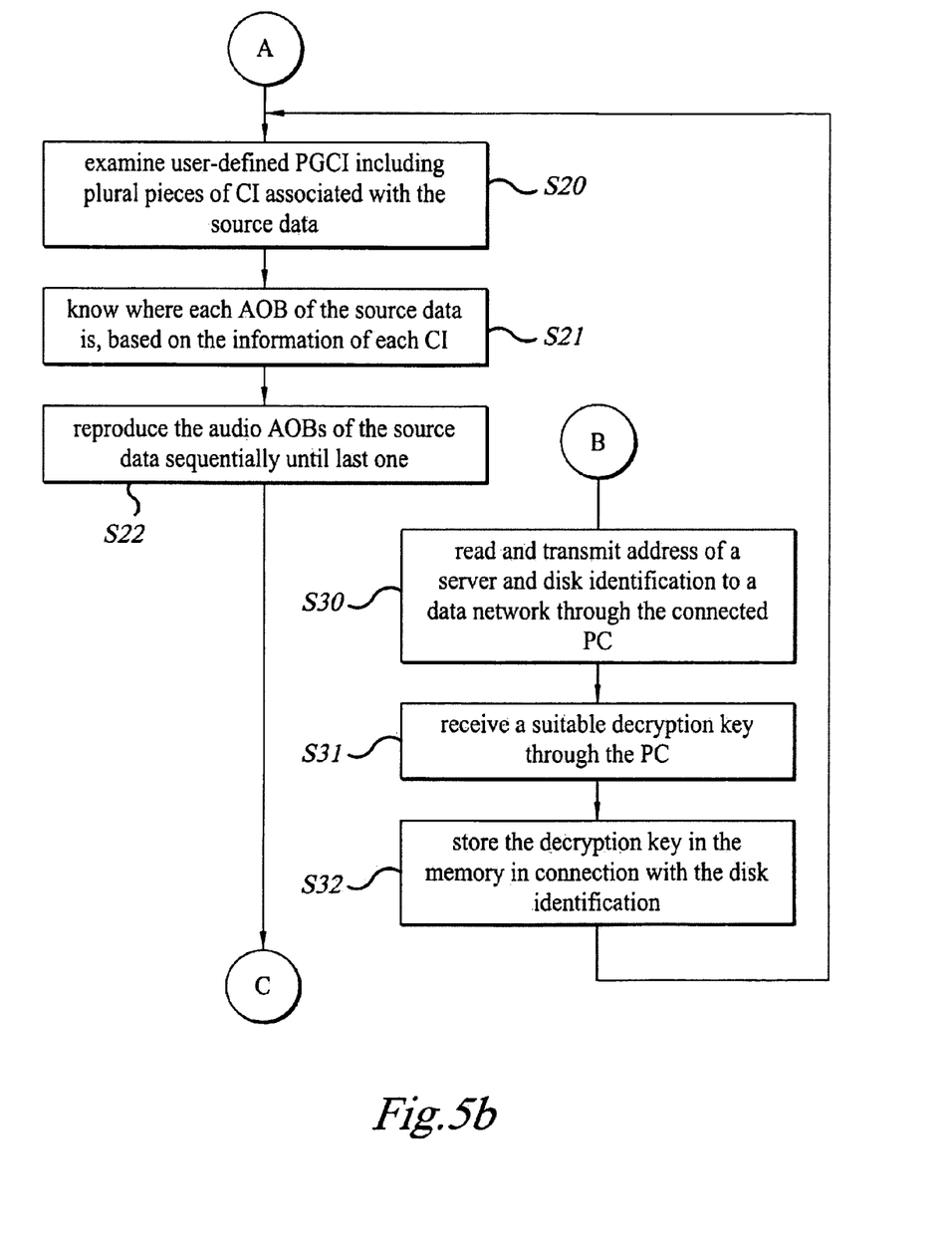

FIGS. 5*a* and 5*b* are flow charts of the embodiment of the present invention.

When the read-only disk 1 is placed in the disk device of FIG. 1 (S10), the system controller 4 reads the above-explained management information, namely, original and user-defined PGCI, CI, and so on written in the management information zone of the read-only disk 1 and stores them into the memory 6 (S11).

Then the system controller 4 will execute a suitable player program that has been pre-written on the read-only disk 1, if necessary (S12), and checks whether or not there is in the memory 6 a decryption key for decrypting the encrypted source data written the read-only disk 1 (S13). The following procedures as well as the decryption key checking procedure can be conducted by the executed player program instead of the system controller 4.

If there is not a decryption key, the system controller 4 composes a play-error message and sends it to a connected PC (S14). The play-error message includes explanation about decryption key purchase as well as the cause that there is no decryption key related with the source data.

Figure 6:
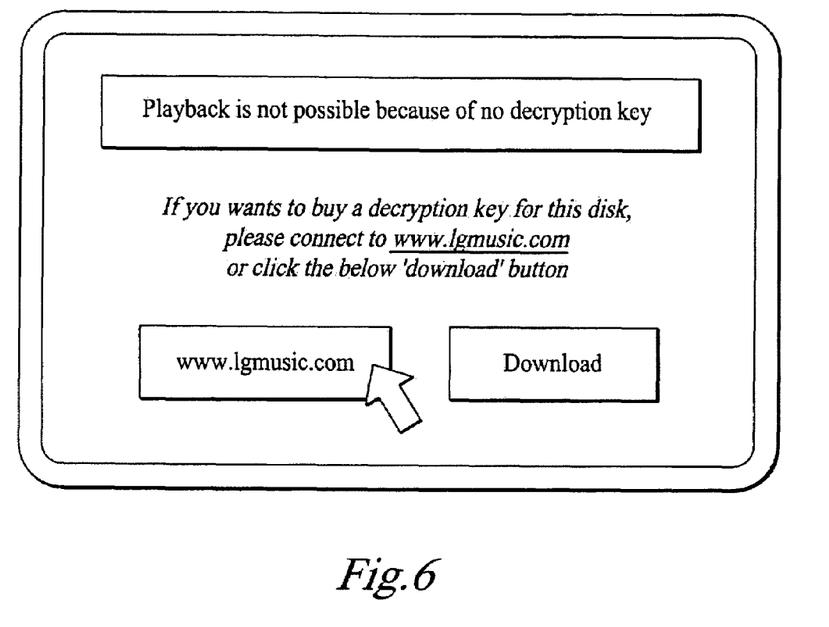
FIG. 6 is a screen example where a play-error window is popped up because of no decryption key.

FIG. 6 is a screen example where such a play-error message is outputted. The play-error message displayed in FIG. 6 includes an inquiry window that asks user whether to buy a decryption key or not. The illustrative inquiry window also includes a URL (Uniform Resource Locator) addressing a web site on Internet that provides decryption keys and a download button that enables a user to buy a decryption key related with the source data through download.

If on-line purchase of decryption key is not requested (S15), the system controller 4 automatically selects and examines the original PGCI, stored in the memory 6, including plural pieces of CI 'Cell 1, 2, 3, . . . ' associated with the sample data (S16). Then, the system controller 4 knows where in the read-only disk 1 each sample AOB is (S17), based on the pair fields 'DA_S_P' and 'DA_E_P' of each CI.

Afterwards, the system controller 4 searches the read-only disk 1 for sample AOBs pointed by each pair of the fields 'DA_S_P' and 'DA_E_P' through moving the optical pickup 2 inward and outward, and it reproduces only the sample AOBs sequentially without any decrypting operation (S18).

Consequently, a user can determine whether or not to buy a decryption key for the source data written on the read-only disk 1 after pre-listening or previewing respective partial audio song or movie recorded on the disk 1 without purchasing an adequate decryption key.

If there is a decryption key (S13), the system controller 4 examines the user-defined PGCI, stored in the memory 6, including plural pieces of CI 'Cell N+1, N+2, N+3, . . . ' associated with the source AOBs (S20). Then, the system controller 4 knows where in the read-only disk 1 each source AOB is (S21), based on the pair fields 'UA_S_P' and 'UA_E_P' of each CI in the user-defined PGCI.

Afterwards, the system controller 4 reads out a decryption key for the source AOBs 'AOB N+1, N+2, N+3, . . . ' from the memory 6 and searches the read-only disk 1 for each source AOB pointed by, each pair of the fields 'UA_S_P' and 'UA_F_P' through moving the optical pickup 2 inward and outward. Whenever target source AOB is found, the system controller 4 conducts reproduction operation of the AOB while decrypting encrypted source data included in the AOB with the read decryption key (S22).

If a user requests on-line purchase of a decryption key in the situation that the play-error window has been displayed (S15), the system controller 4 reads from the management zone of the read-only disk 1 or the memory 6 both a URL (Uniform Resource Locator), information of a web site that provides a desirable, decryption key for the source data and disk identification, e.g., 2-byte serial number assigned to the read-only disk 1. The read address and disk identification are transmitted to the connected PC (S30).

The above purchasing process is initiated by a user's clicking the 'download' button on the illustrative play-error window shown in FIG. 6.

The web site addressed by the stored URL identifies which decryption key is requested based on the received disk identification. Namely, it searches its database for a decryption key linked with the received disk identification or serial number. If found, the web site downloads the found decryption key to the PC. The PC delivers the downloaded decryption key to the system controller 4 of the disk drive connected to the PC (S31). This decryption key delivery may be conducted in accordance with a protocol pre-specified between the web site and a PC connected to the web site.

The URL and disk identification that have been recorded in the management information zone of the read-only disk 1 are retrieved into the memory 6 together with the management information such as PGCI and CI when the disk 1 is placed in the disk drive.

The system controller 4 stores the received decryption key in the memory 6 (S32) in connection with the disk identification.

Afterwards, the system controller 4 reproduces entire source AOBs pointed by every CI in the user-defined PGCI sequentially while decrypting encrypted source data with the stored decryption key in the memory 6, the same as explained above.

In addition, the user-defined, PGCI may not be written in the management information zone of the read-only disk 1. Instead, it can be provided from a web site to download a requested decryption key when a purchase of the decryption key is requested with disk identification. The provided user-defined PGCI matched with the source data of the read-only disk 1 is stored in the memory 6 and then is referred by the system controller 4 when playback of source AOBs are conducted.

The above-explained method is applicable to a variety of read-only disks such as a compact disk (CD) and video CD besides a DVD-ROM. Further, the present method can be applied to moving-picture data and still-picture data, besides audio data.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of reproducing content, the method being performed by at least one device including a controller and the method comprising:

checking, by the controller, whether a first management information required to decrypt encrypted digital content is present;

checking, by the controller, whether sample data associated with the encrypted digital content is present to reproduce the sample data without the first management information;

requesting, by the controller, a second management information from an external source, wherein the second management information includes at least one of start information and end information of the sample data;

receiving the second management information from the external source; and reproducing, by the controller, the sample data using the second management information when the sample data is present.

2. The method of claim 1, wherein the second management information corresponds to identification information assigned to the encrypted digital content.

3. The method of claim 1, wherein the external source is indicated by URL information.

4. The method of claim 1, wherein the reproduction of the sample data is controlled by the second management information.

5. The method of claim 1, wherein the sample data is identical to at least a portion of the encrypted digital content.

6. An apparatus for reproducing content, the apparatus comprising:
a controller configured to check whether a first management information required to decrypt encrypted digital content is present and whether sample data associated with the encrypted digital content is present to reproduce the sample data without the first management information, to request a second management information from an external source, to receive the second management information from the external source, and to reproduce the sample data using the received second management information when the sample data is present,
wherein the second management information includes at least one of start information and end information of the sample data.

7. The apparatus of claim 6, wherein the second management information corresponds to identification information assigned to the encrypted digital content.

8. The apparatus of claim 6, wherein the external source is indicated by URL information.

9. The apparatus of claim 6, wherein the reproduction of the sample data is controlled by the second management information.

10. The apparatus of claim 6, wherein the sample data is identical to at least a portion of the encrypted digital content.

* * * * *